US007429847B2

(12) United States Patent
Yamada et al.

(10) Patent No.: US 7,429,847 B2
(45) Date of Patent: Sep. 30, 2008

(54) MOTOR CONTROL DEVICE

(75) Inventors: Kenji Yamada, Toyota (JP); Hideaki Saida, Toyota (JP); Satoru Katou, Nissin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/795,289

(22) PCT Filed: Apr. 28, 2006

(86) PCT No.: PCT/JP2006/309362

§ 371 (c)(1),
(2), (4) Date: Jul. 16, 2007

(87) PCT Pub. No.: WO2006/121061

PCT Pub. Date: Nov. 16, 2006

(65) Prior Publication Data

US 2008/0116832 A1 May 22, 2008

(30) Foreign Application Priority Data

May 9, 2005 (JP) ............................ 2005-136217

(51) Int. Cl.
*H02P 23/00* (2006.01)

(52) U.S. Cl. ........................ 318/799; 318/632; 318/432

(58) Field of Classification Search ................. 318/432, 318/434, 632, 638, 639, 799
See application file for complete search history.

(56) References Cited

U.S. PATENT DOCUMENTS 5,197,008 A * 3/1993 Itoh et al. ..................... 701/70
5,428,285 A * 6/1995 Koyama et al. ............. 318/799
6,077,186 A 6/2000 Kojima et al.
6,343,586 B1 * 2/2002 Muto et al. ............ 123/406.25
6,671,596 B2 * 12/2003 Kawashima et al. .......... 701/37

FOREIGN PATENT DOCUMENTS

| | | |
|---|---|---|
| JP | A 7-177784 | 7/1995 |
| JP | A 11-178113 | 7/1999 |
| JP | A 2000-32607 | 1/2000 |
| JP | A 2000-69607 | 3/2000 |
| JP | A 2003-164008 | 6/2003 |
| JP | A 2004-147491 | 5/2004 |
| JP | A 2004-222439 | 8/2004 |
| JP | A 2005-206343 | 8/2005 |

* cited by examiner

*Primary Examiner*—Rina I Duda
(74) *Attorney, Agent, or Firm*—Oliff & Berridge, PLC

(57) ABSTRACT

A controller performs processing for calculating a main torque control value, processing for outputting a final control torque value based on the main torque control value and a vibration-suppression torque control value for mitigating torque fluctuation that occurs when a rotating electric machine is operated at the main torque control value, and processing for calculating the vibration-suppression torque control value. The processing for calculating the vibration-suppression torque control value includes processing for calculating an original control value serving as a source of the vibration-suppression torque control value, processing for performing guard processing for restricting the original control value by using a vibration suppression guard value, and processing for smoothing an angular portion where rate of change is discontinuous, that is generated in the torque control value that has been subjected to the guard processing.

12 Claims, 7 Drawing Sheets

MOTOR CONTROL DEVICE

TECHNICAL FIELD

The present invention relates to a motor control device.

BACKGROUND ART

In recent years, some hybrid cars are seen running on the road in a stream of cars supplied with power only from a common internal combustion engine. The hybrid car refers to a vehicle developed for improving exhaust emission deterioration or fuel efficiency lowering involved with driving only with the internal combustion engine.

A hybrid car refers to a vehicle including a motor-generator that serves as a motor generating drive torque using electric power or as a generator, together with the internal combustion engine. Japanese Patent Laying-Open No. 11-178113 discloses adoption of a guard value when a final torque is large, the final torque being torque resulting from addition of assist torque for starting an engine and drive torque necessary for running of such a hybrid car.

Conventionally, in motor control, a final torque control value has been calculated by calculating a waveform of vibration-suppression torque for suppressing vibration such as torque ripple involved with rotation of the motor separately from a waveform of torque control for propelling a vehicle and adding these waveforms together. For such a torque control value, a guard value for motor protection has been set.

FIG. 14 is a diagram showing a waveform of the final torque control value obtained by applying the guard value.

Referring to FIG. 14, a guard value GT is applied to a torque control raw value TR based on an acceleration request from an accelerator pedal or the like operated by a driver and the resultant value is subjected to filtering processing, thereby calculating a torque filter value TRF.

Meanwhile, a waveform, obtained as a result that guard values G1, G2 for the vibration-suppression torque are applied to a raw value Y for vibration-suppression torque for mitigating torque ripple of the motor, is superimposed on torque filter value TRF. Final torque control value T is thus calculated.

Final torque control value T, however, abruptly varies at angular portions PA, PB. Therefore, follow-up characteristic of accuracy in current feedback control is deteriorated.

FIG. 15 is a waveform diagram for illustrating a state where follow-up characteristic of accuracy in current feedback control has deteriorated.

Referring to FIG. 15, in a portion where the vibration-suppression torque control value abruptly varies as shown in FIG. 15, overshoot occurs as shown with A, B and C, a current that should not originally be fed flows, and power is wasted. In addition, increase in the current may affect the life of a battery and an inverter.

DISCLOSURE OF THE INVENTION

An object of the present invention is to provide a motor control device with improved controllability.

In summary, the present invention is directed to a motor control device, including: a main torque control value calculation unit calculating a main torque control value; a final control torque value output unit outputting a final control torque value based on the main torque control value and a vibration-suppression torque control value for mitigating torque fluctuation that occurs when a rotating electric machine is operated at the main torque control value; and a vibration-suppression torque control value calculation unit calculating the vibration-suppression torque control value. The vibration-suppression torque control value calculation unit includes an original control value calculation unit calculating an original control value serving as a source of the vibration-suppression torque control value, a guard processing unit performing guard processing for restricting the original control value by using a vibration-suppression guard value, and a smoothing unit smoothing an angular portion where rate of change is discontinuous, that is generated in a torque control value that has been subjected to the guard processing.

Preferably, the main torque control value calculation unit includes an original main torque control value calculation unit calculating a first control value serving as a source of the main torque control value in accordance with an acceleration request, a main guard processing unit performing main guard processing for restricting the first control value by using a main guard value, and a main torque smoothing unit smoothing an angular portion where rate of change is discontinuous, that is generated in the first control value that has been subjected to the main guard processing, and outputting the main torque control value.

According to another aspect of the present invention, a motor control device includes: a main torque control value calculation unit calculating a main torque control value; a final control torque value output unit outputting a final control torque value based on the main torque control value and a vibration-suppression torque control value for mitigating torque fluctuation that occurs when a rotating electric machine is operated at the main torque control value; and a vibration-suppression torque control value calculation unit calculating the vibration-suppression torque control value. The vibration-suppression torque control value calculation unit includes an original control value calculation unit calculating an original control value serving as a source of the vibration-suppression torque control value, a provisional control value calculation unit calculating a provisional vibration-suppression torque control value by performing filtering processing, assuming that a vibration-suppression guard value is provided next time as the original control value to the current vibration-suppression torque control value, and a vibration-suppression torque control value selection unit selecting the vibration-suppression torque control value based on comparison of the provisional vibration-suppression torque control value with the actually provided original control value.

Preferably, the provisional control value calculation unit uses an upper limit value and a lower limit value as the vibration-suppression guard value to calculate first and second provisional vibration-suppression torque control values. While the actually provided original control value is present between the first and second provisional vibration-suppression torque control values, the vibration-suppression torque control value selection unit selects the original control value as the vibration-suppression torque control value, and if the actually provided original control value is not present between the first and second provisional vibration-suppression torque control values, the vibration-suppression torque control value selection unit selects any one of the first and second provisional vibration-suppression torque control values as the vibration-suppression torque control value.

Preferably, the main torque control value calculation unit includes an original main torque control value calculation unit calculating a first control value serving as a source of the main torque control value in accordance with an acceleration request, a main guard processing unit performing main guard processing for restricting the first control value by using a main guard value, and a main torque smoothing unit smoothing an angular portion where rate of change is discontinuous, that is generated in the first control value that has been subjected to the main guard processing, and outputting the main torque control value.

According to yet another aspect of the present invention, a motor control device includes: means for calculating a main torque control value; means for outputting a final control torque value based on the main torque control value and a vibration-suppression torque control value for mitigating torque fluctuation that occurs when a rotating electric machine is operated at the main torque control value; and means for calculating the vibration-suppression torque control value. The means for calculating the vibration-suppression torque control value includes means for calculating an original control value serving as a source of the vibration-suppression torque control value, means for performing guard processing for restricting the original control value by using a vibration-suppression guard value, and means for smoothing an angular portion where rate of change is discontinuous, that is generated in a torque control value that has been subjected to the guard processing.

Preferably, the means for calculating the main torque control value includes means for calculating a first control value serving as a source of the main torque control value in accordance with an acceleration request, means for performing main guard processing for restricting the first control value by using a main guard value, and means for smoothing an angular portion where rate of change is discontinuous, that is generated in the first control value that has been subjected to the main guard processing, and outputting the main torque control value.

According to yet another aspect of the present invention, a motor control device includes: means for calculating a main torque control value; means for outputting a final control torque value based on the main torque control value and a vibration-suppression torque control value for mitigating torque fluctuation that occurs when a rotating electric machine is operated at the main torque control value; and means for calculating the vibration-suppression torque control value. The means for calculating the vibration-suppression torque control value includes means for calculating an original control value serving as a source of the vibration-suppression torque control value, means for calculating a provisional vibration-suppression torque control value by performing filtering processing, assuming that a vibration-suppression guard value is provided next time as the original control value to the current vibration-suppression torque control value, and means for selecting the vibration-suppression torque control value based on comparison of the provisional vibration-suppression torque control value with the actually provided original control value.

Preferably, the means for calculating a provisional vibration-suppression torque control value uses an upper limit value and a lower limit value as the vibration-suppression guard value to calculate first and second provisional vibration-suppression torque control values. While the actually provided original control value is present between the first and second provisional vibration-suppression torque control values, the means for selecting the vibration-suppression torque control value selects the original control value as the vibration-suppression torque control value, and if the actually provided original control value is not present between the first and second provisional vibration-suppression torque control values, the means for selecting the vibration-suppression torque control value selects any one of the first and second provisional vibration-suppression torque control values as the vibration-suppression torque control value.

Preferably, the means for calculating a main torque control value includes means for calculating a first control value serving as a source of the main torque control value in accordance with an acceleration request, means for performing main guard processing for restricting the first control value by using a main guard value, and means for smoothing an angular portion where rate of change is discontinuous, that is generated in the first control value that has been subjected to the main guard processing, and outputting the main torque control value.

According to yet another aspect of the present invention, a motor control device is a motor control device mounted on a vehicle, the vehicle including a rotating electric machine, a wheel that rotates along with rotation of the rotating electric machine, and the motor control device controlling the rotating electric machine. The motor control device calculates a main torque control value, calculates an original control value serving as a source of a vibration-suppression torque control value for mitigating torque fluctuation that occurs when the rotating electric machine is operated at the main torque control value, performs guard processing for restricting the original control value by using a vibration-suppression guard value, smoothes an angular portion where rate of change is discontinuous, that is generated in a torque control value that has been subjected to the guard processing, and outputs a final control torque value based on the main torque control value and the vibration-suppression torque control value.

According to yet another aspect of the present invention, a motor control device is a motor control device mounted on a vehicle, the vehicle including a rotating electric machine, a wheel that rotates along with rotation of the rotating electric machine, and the motor control device controlling the rotating electric machine. The motor control device calculates a main torque control value, calculates an original control value serving as a source of a vibration-suppression torque control value for mitigating torque fluctuation that occurs when the rotating electric machine is operated at the main torque control value, calculates a provisional vibration-suppression torque control value by performing filtering processing, assuming that a vibration-suppression guard value is provided next time as the original control value to the current vibration-suppression torque control value, selects the vibration-suppression torque control value based on comparison of the provisional vibration-suppression torque control value with the actually provided original control value, and outputs a final control torque value based on the main torque control value and the vibration-suppression torque control value.

According to the present invention, the motor can be controlled such that abrupt change in the torque is not caused even if vibration-suppression control is carried out.

In addition, another effect is obtained in that the motor can be controlled such that abrupt change in the torque is not caused while maintaining vibration-suppression effect.

BEST MODES FOR CARRYING OUT THE INVENTION

Figure 1:
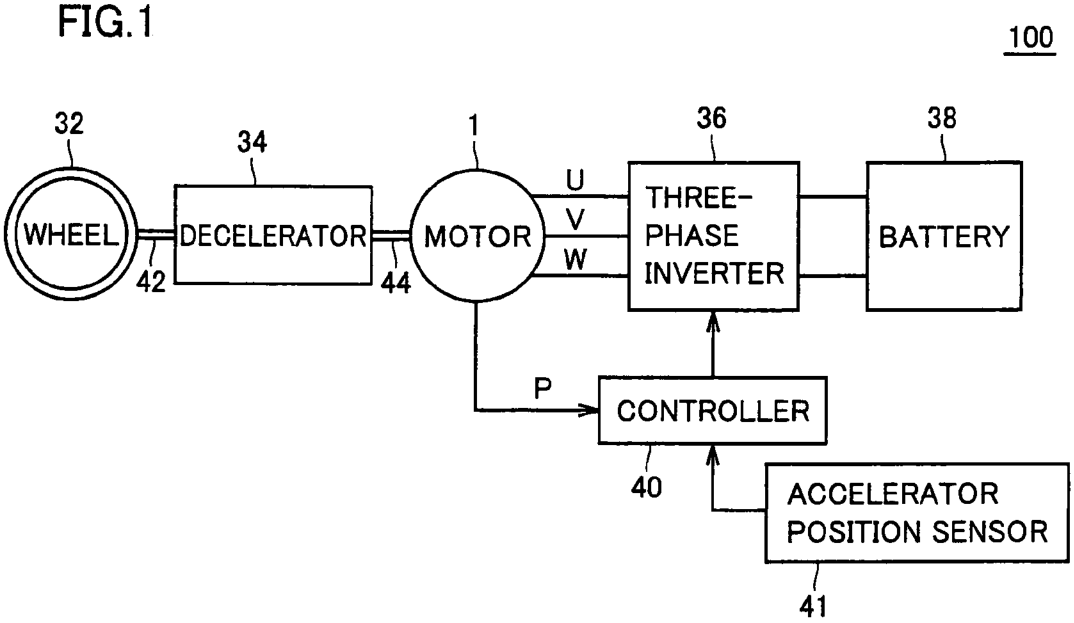
FIG. 1 illustrates a configuration of a vehicle drive system 100 to which a motor control device of the present invention is applied.

An embodiment of the present invention will be described hereinafter in detail with reference to the drawings. The same or corresponding elements in the drawings have the same reference characters allotted, and detailed description thereof will not be repeated.

First Embodiment

FIG. 1 illustrates a configuration of a vehicle drive system 100 to which a motor control device of the present invention is applied.

Referring to FIG. 1, vehicle drive system 100 includes a battery 38, a three-phase inverter 36 receiving energy from battery 38 during power running or returning energy to battery 38 during regenerative running, and a motor 1 in which a current and a voltage for U-phase, V-phase, and W-phase coils are controlled by three-phase inverter 36. Though not shown, three-phase inverter 36 includes a power semiconductor device such as an IGBT.

Vehicle drive system 100 further includes an accelerator position sensor 41 detecting a position of an accelerator pedal operated by a driver, and a controller 40 receiving rotation information P from motor 1 and controlling three-phase inverter 36 in accordance with an output of accelerator position sensor 41. Though not shown, controller 40 includes a CPU, an ROM, an RAM and the like.

Vehicle drive system 100 further includes a decelerator connected to an output shaft 44 of the motor and a wheel 32 connected to an output shaft of decelerator 34.

Figure 2:
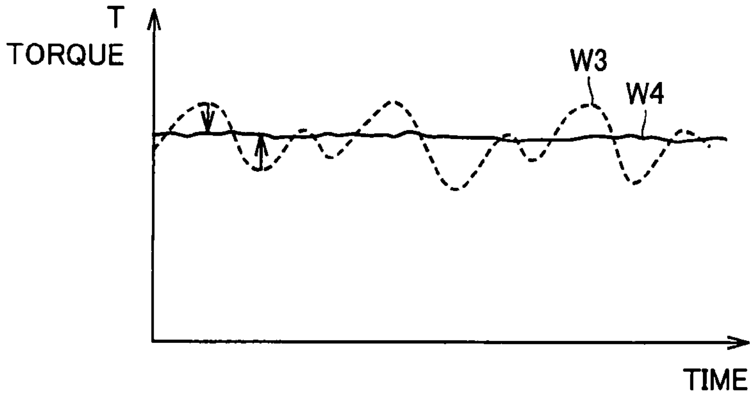
FIG. 2 illustrates a measure taken by a controller 40 for mitigating torque ripple.

FIG. 2 illustrates a measure taken by controller 40 for mitigating torque ripple.

Referring to FIGS. 1 and 2, receiving rotation information P provided from motor 1, controller 40 issues an instruction to feed three-phase inverter 36 with a compensation current that adapts to the phase generated by the torque ripple. Thus, the crest and the trough of the torque are averaged by the compensation current, and a waveform W3 where torque ripple has occurred is improved to a waveform W4.

A vibration-suppression torque control value is calculated as a control value serving as the source for feeding such a compensation current. In order to rotate the motor by performing such vibration-suppression processing, controller 40 performs processing for calculating a main torque control value, processing for calculating a vibration-suppression torque control value, and processing for calculating a final torque control value by combining the two torque control values that were obtained.

Figure 3:
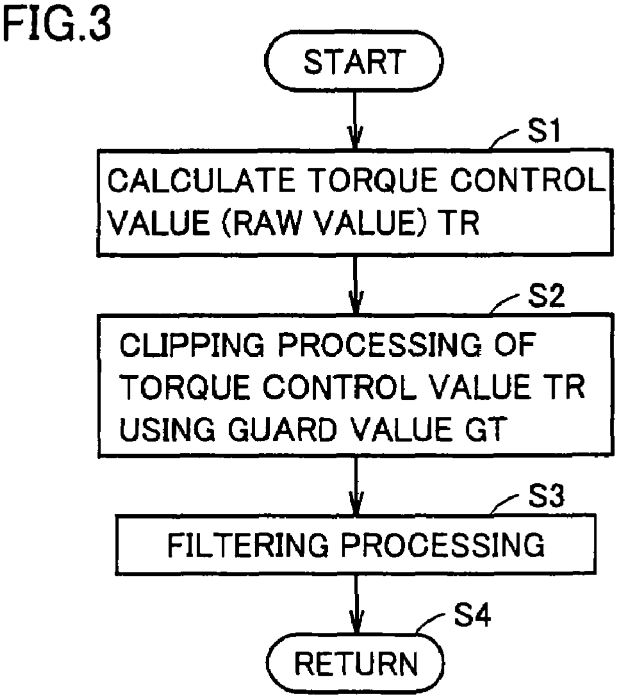
FIG. 3 is a flowchart for illustrating processing for calculating a main torque control value, that is performed in controller 40 in FIG. 1.

FIG. 3 is a flowchart for illustrating processing for calculating the main torque control value, that is performed in controller 40 in FIG. 1.

Referring to FIG. 3, when the processing is initially performed, in step S1, controller 40 calculates a torque control value (raw value) TR serving as the source of the main torque control value, in accordance with the output of accelerator position sensor 41. In the case of a hybrid car using the engine along with the motor, a ratio of torque between the engine and the motor and the like are further taken into account at the time of calculation.

Thereafter, in step S2, torque control value TR is subjected to clipping processing, in which the upper limit thereof is restricted by a guard value GT.

Further, in step S3, the clipped torque control value is subjected to filtering processing, whereby the main torque control value is calculated. The process proceeds to step S4, and calculation of the main torque control value ends.

Figure 4:
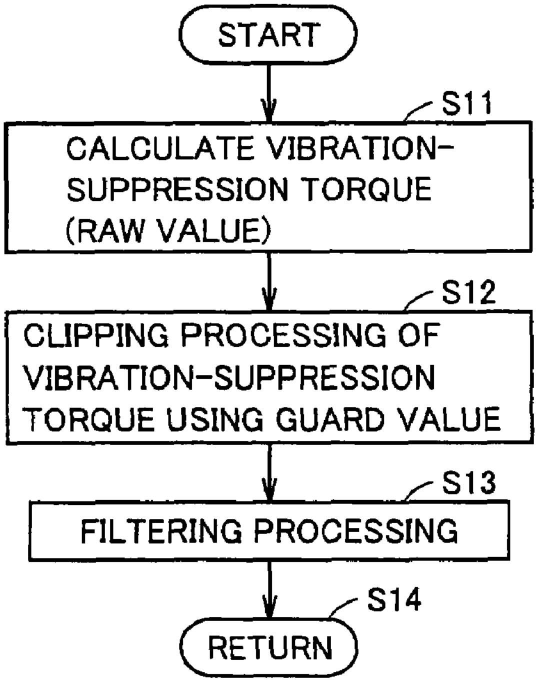
FIG. 4 is a flowchart for illustrating processing for calculating a vibration-suppression torque control value, that is performed in controller 40.

FIG. 4 is a flowchart for illustrating processing for calculating the vibration-suppression torque control value, that is performed in controller 40.

Referring to FIG. 4, when the processing is initially started, in step S11, a vibration-suppression torque (raw value) is calculated. The vibration-suppression torque is calculated based on a rotation phase and a speed of a rotor of the motor. In addition, in the case of a hybrid car, the vibration-suppression torque may be calculated, taking into account the phase for canceling vibration of the engine, in addition to aforementioned factors.

Thereafter, the vibration-suppression torque control value is subjected to clipping processing by using the guard value in step S12, and to filtering processing in step S13. The process proceeds to step S14 and the process ends. The filtering processing is not particularly limited, however, for example, a general first-order delay filter or the like may be employed.

The first-order delay filter performs a first-order operation with a delay constant T being set. Here, the expression $Xo(s)=1/(1+Ts)\cdot Xi(s)$ is given, where $Xo(s)$ represents an output signal and $Xi(s)$ represents an input signal.

Namely, the processing for calculating the vibration-suppression torque control value includes processing for calculating the original control value serving as the source of the vibration-suppression torque control value (step S11), processing for performing guard processing for restricting the original control value by using the vibration-suppression guard value (step S12), and processing for smoothing an angular portion where rate of change is discontinuous, that is generated in the torque control value that has been subjected to the guard processing (step S13).

Figure 5:
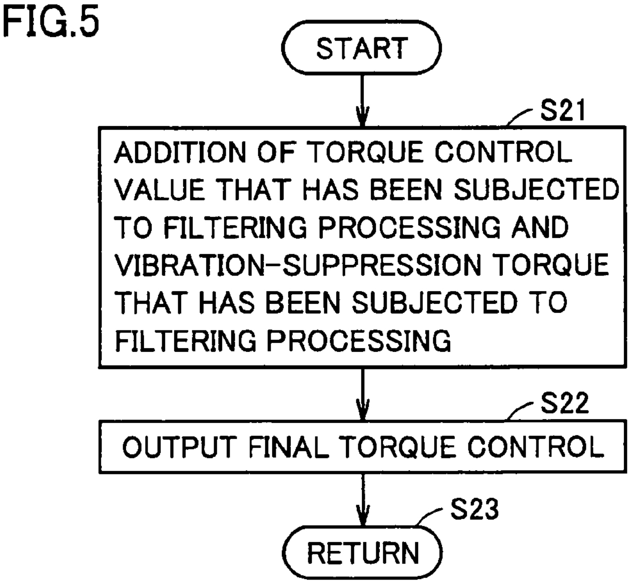
FIG. 5 is a flowchart for illustrating processing for combining the main torque control value and the vibration-suppression torque control value, that is performed in controller 40.

FIG. 5 is a flowchart for illustrating processing for combining the main torque control value and the vibration-suppression torque control value performed in controller 40.

Referring to FIG. 5, when the processing is started, in step S21, addition of the main torque control value that has been subjected to filtering processing in FIG. 3 and the vibration-suppression torque control value that has been subjected to filtering processing in FIG. 4 is performed.

Then, in step S22, controller 40 outputs the final torque control value to three-phase inverter 36 that drives motor 1. Thereafter, the process proceeds to step S23 and the process ends.

Figure 6:
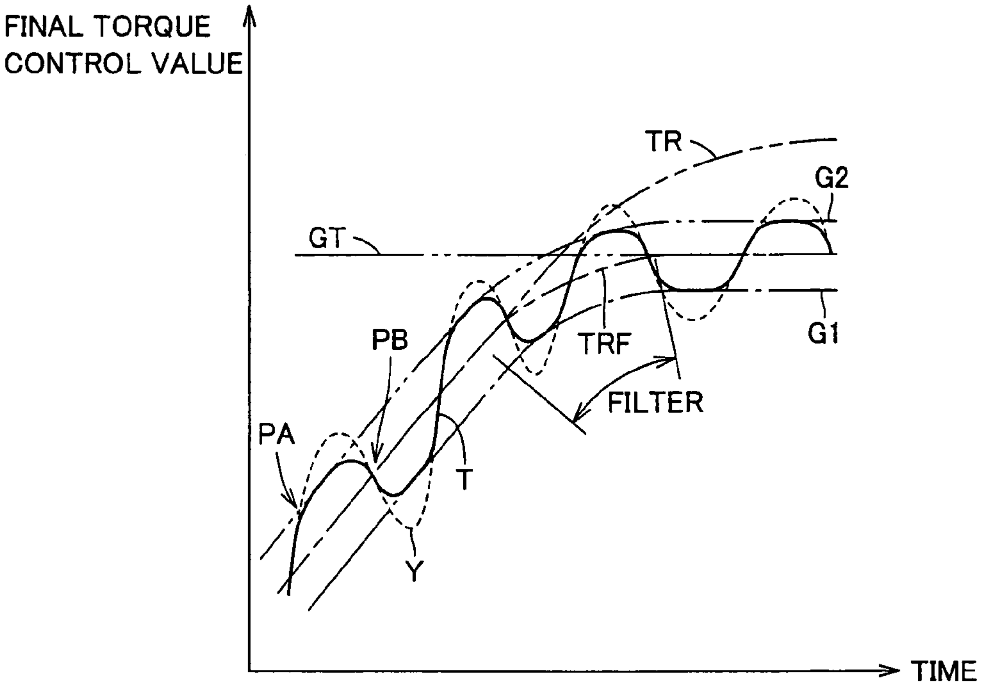
FIG. 6 is a waveform diagram showing a waveform of a final torque control value applied in a first embodiment.

FIG. 6 is a waveform diagram showing a waveform of the final torque control value applied in the first embodiment.

In FIG. 6, torque filter value TRF is a value obtained in the processing for calculating the main torque control value in FIG. 3.

Figure 15:
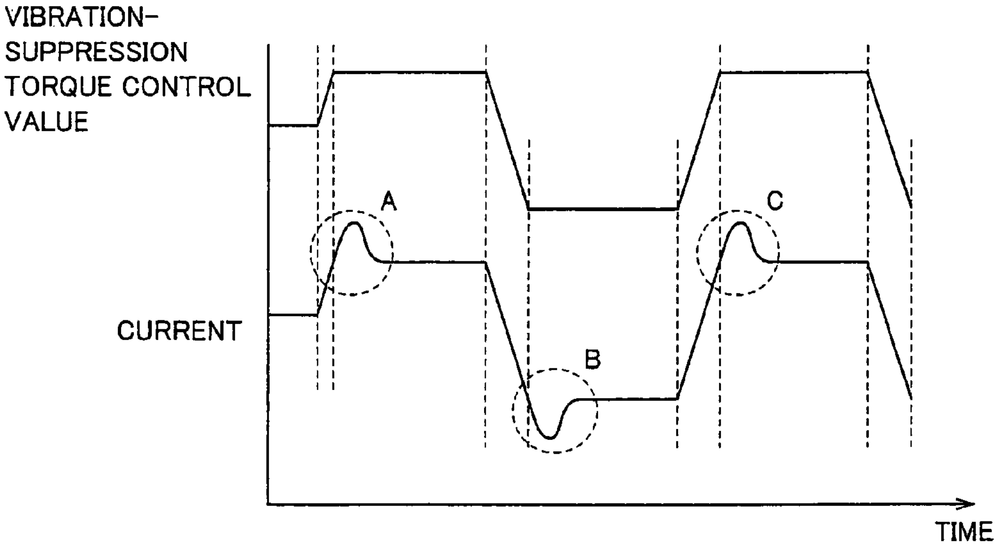
FIG. 15 is a waveform diagram for illustrating a state where follow-up characteristic of accuracy in current feedback control has deteriorated.

In contrast, final torque control value T shown in FIG. 6 is obtained by superimposing the vibration-suppression torque control value obtained in FIG. 4. According to the first embodiment, portions PA, PB that have been referred to as angular portions as shown in FIG. 15 exhibit a smooth waveform, and the overshoot of the current is mitigated.

Second Embodiment

In the first embodiment, the vibration-suppression torque control value is subjected to filtering processing. Therefore, phase delay may be caused in the vibration-suppression torque control value and the vibration-suppression effect may be lowered. For example, if the phase varies by 180°, oscillation may occur, without the vibration-suppression effect being exhibited.

In the second embodiment, the processing for calculating the vibration-suppression torque control value in FIG. 4 among those performed in the first embodiment is modified. As the processing for calculating the main torque control value and the processing for calculating the final torque control value by combining the two torque control values that were obtained are the same as those described in connection with FIGS. 3 and 5, description thereof will not be repeated.

Figure 7:
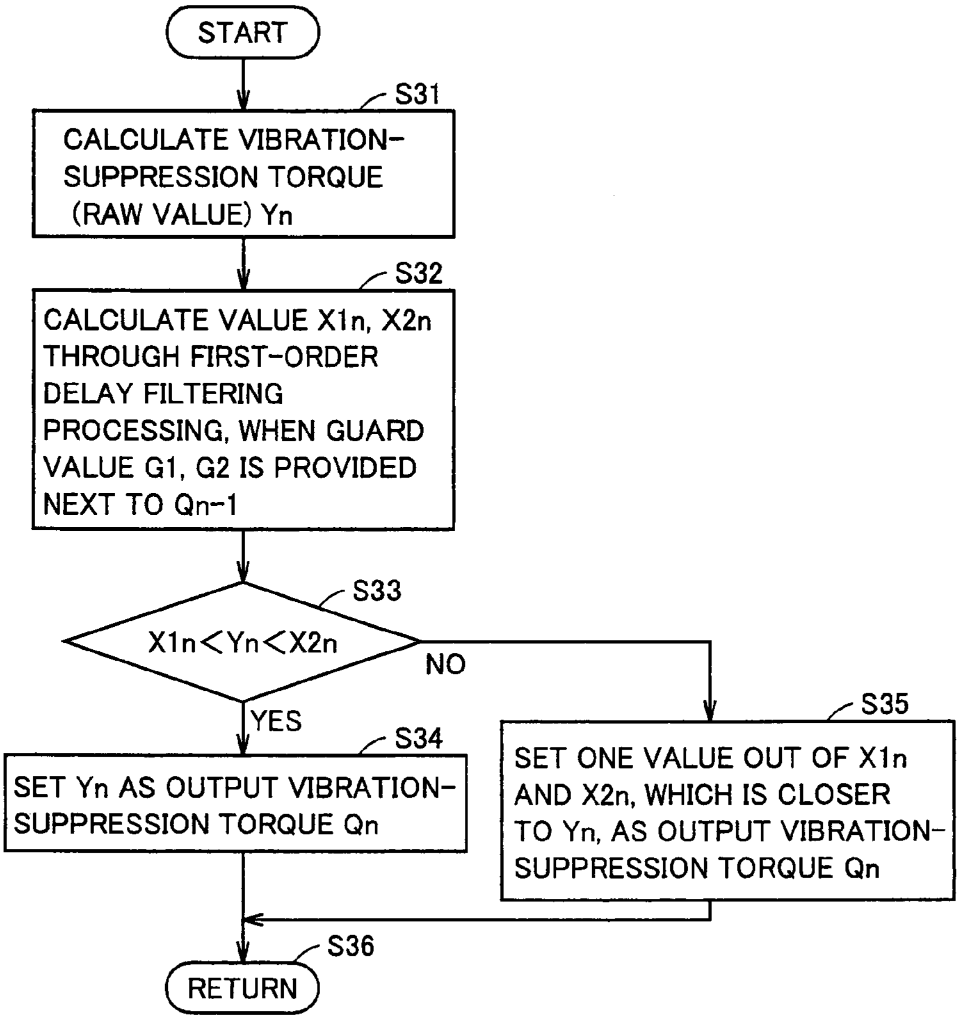
FIG. 7 is a flowchart showing a configuration of a program related to calculation of the vibration-suppression torque control value, that is executed in a second embodiment.

FIG. 7 is a flowchart showing a configuration of a program related to calculation of the vibration-suppression torque control value, executed in the second embodiment.

Referring to FIG. 7, when the processing is initially started, in step S31, a vibration-suppression torque (raw value) Yn is calculated. The raw value is calculated based on the phase of the rotor, the rotation speed of the rotor, vibration of the engine, and the like.

Thereafter, in step S32, assuming that guard value G1, G2 for the vibration-suppression torque is provided as a value next to a vibration-suppression torque control value Qn-1 calculated previously, the guard value is subjected to the first-order delay filtering processing, thereby obtaining value X1*n*, X2*n*.

Then, in step S33, based on comparison of vibration-suppression torque (raw value) Yn with calculated values X1*n*, X2*n*, whether relation of X1*n*<Yn<X2*n* is established or not is determined.

If relation of X1*n*<Yn<X2*n* is established in step S33, the process proceeds to step S34. Otherwise, the process proceeds to step S35.

In step S34, vibration-suppression torque (raw value) Yn is set as an output vibration-suppression torque Qn. Meanwhile, if the process proceeds to step S35, any one closer to vibration-suppression torque (raw value) Yn, out of calculated values X1*n* and X2*n*, is selected as output vibration-suppression torque Qn.

After the processing in step S34 or step S35, the process proceeds to step S36 and the processing for calculating the output vibration-suppression torque ends.

Namely, the processing for calculating the vibration-suppression torque control value includes processing for calculating the original control value serving as the source of the vibration-suppression torque control value (step S31), processing for calculating a provisional vibration-suppression torque control value by performing filtering processing, assuming that the vibration-suppression guard value is provided next time as the original control value to the current vibration-suppression torque control value (step S32), and processing for selecting the vibration-suppression torque control value based on comparison of the provisional vibration-suppression torque control value with the actually provided original control value (steps S33 to S35).

Preferably, in the processing for calculating the provisional vibration-suppression torque control value, upper limit value G2 and lower limit value G1 are used as the vibration-suppression guard values to calculate provisional vibration-suppression torque control values X2*n*, X1*n*. In the processing for selecting the vibration-suppression torque control value, while the actually provided original control value is present between the first and second provisional vibration-suppression torque control values, the original control value is selected as the vibration-suppression torque control value (step S34), and if the actually provided original control value is not present between the first and second provisional vibration-suppression torque control values, any one of the first and second provisional vibration-suppression torque control values is selected as the vibration-suppression torque control value (step S35).

Figure 8:
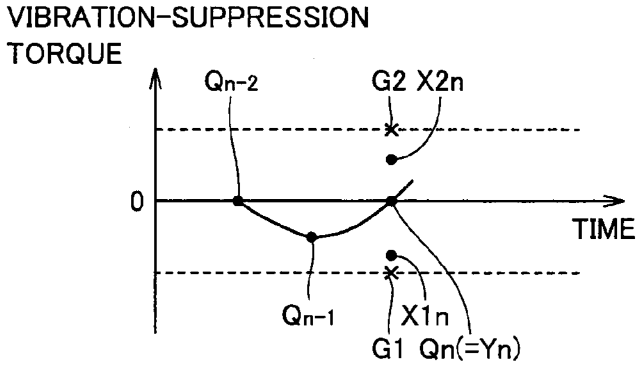
FIG. 8 is a waveform diagram illustrating a case where a process proceeds to step S34 in FIG. 7.

FIG. 8 is a waveform diagram illustrating a case where the process proceeds to step S34 in FIG. 7.

FIG. 8 shows a case where output vibration-suppression torques Qn-2, Qn-1 have been calculated by now and output vibration-suppression torque Qn is calculated next. Here, a case where vibration-suppression torque (raw value) Yn calculated in step S31 in FIG. 7 may be present outside the guard value is assumed. Assuming that guard value G1, G2 is provided as a value next to output vibration-suppression torques Qn-2, Qn-1 in step S32, the guard value is subjected to the first-order delay filtering processing, thereby obtaining value X1*n*, X2*n*.

In FIG. 8, vibration-suppression torque (raw value) Yn is present between values X1*n* and X2*n*. Therefore, even if raw value Yn is selected as it is as output vibration-suppression torque Qn, the torque waveform is smooth, instead of being angular.

Therefore, raw value Yn is selected as it is as output vibration-suppression torque Qn, and thus output vibration-suppression torque Qn without phase delay with respect to requested vibration-suppression torque is set.

Figure 9:
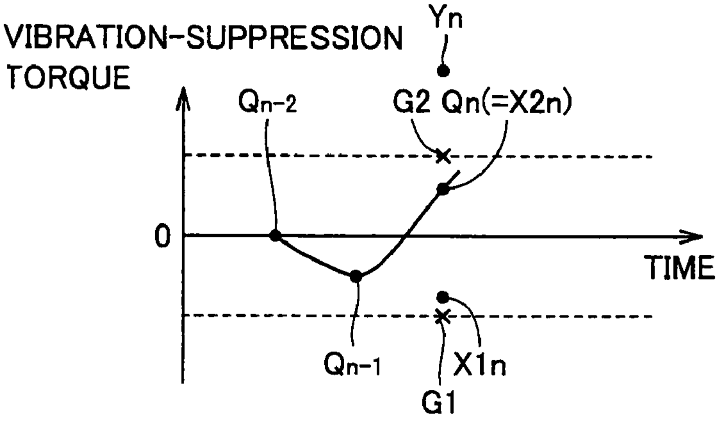
FIG. 9 is a waveform diagram illustrating a case where a process proceeds to step S35 in FIG. 7.

FIG. 9 is a waveform diagram illustrating a case where the process proceeds to step S35 in FIG. 7.

Referring to FIGS. 7 and 9, a case where output vibration-suppression torques Qn-2, Qn-1 have successively been output by now and output vibration-suppression torque Qn is calculated next is shown. In the case shown in FIG. 9, vibration-suppression torque (raw value) Yn is present outside guard values G1, G2. Therefore, any one closer to raw value Yn, out of values X1*n* and X2*n* obtained by subjecting guard values G1, G2 to first-order delay filtering processing is selected as output vibration-suppression torque Qn.

In the case shown in FIG. 9, as raw value Yn is outside guard value G2, value X2*n* is closer to raw value Yn. Therefore, value X2*n* is selected as output vibration-suppression torque Qn.

As a result of selection of output vibration-suppression torque Qn in the processing described in connection with FIGS. 7 to 9, the filtering processing is not performed except for when necessary, and occurrence of the phase delay can be avoided.

Figure 10:
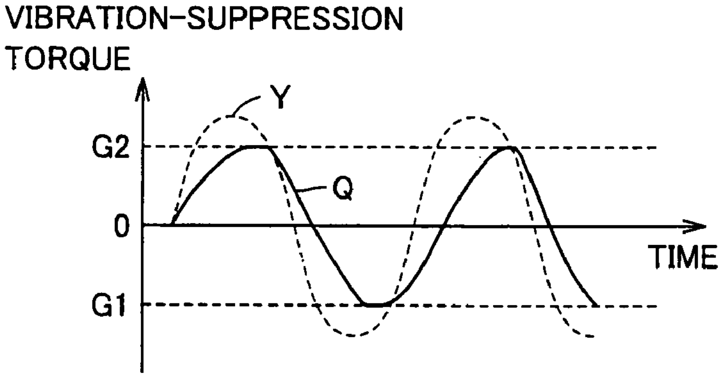
FIG. 10 is a diagram of a first example showing how a vibration-suppression torque output value Q calculated in the second embodiment varies with respect to a raw value Y.
Figure 11:
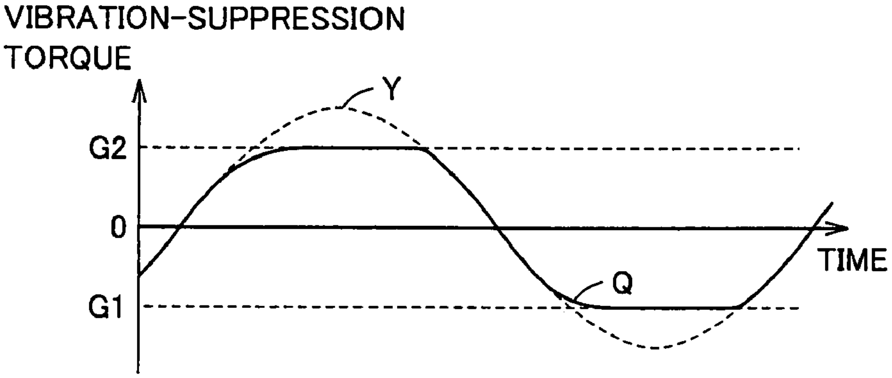
FIG. 11 is a diagram of a second example showing how vibration-suppression torque output value Q calculated in the second embodiment varies with respect to raw value Y.
Figure 12:
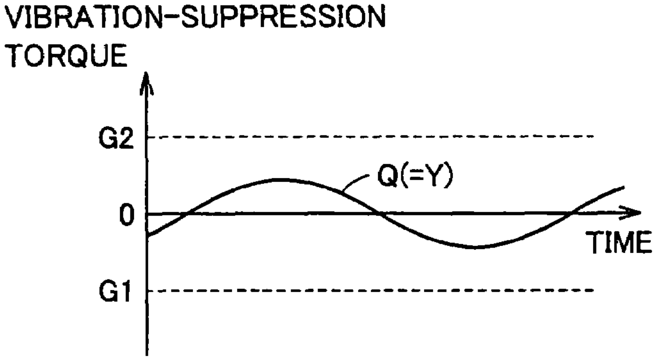
FIG. 12 is a diagram of a third example showing how vibration-suppression torque output value Q calculated in the second embodiment varies with respect to raw value Y.

FIGS. 10, 11 and 12 are diagrams of first to third examples showing how vibration-suppression torque output value Q calculated in the second embodiment varies with respect to raw value Y.

As shown in FIG. 10, if the frequency of raw value Y is high and the peak value thereof is present outside guard values G1, G2, phase delay to some extent occurs in the waveform.

As shown in FIG. 1, however, if the frequency is at a level less likely to be affected by the filtering processing although the peak of raw value Y is present outside guard values G1, G2, in a region between guard values G1, G2, raw value Y is reflected in output vibration-suppression torque Q with fidelity as high as possible. Then, the angular portion representing a point of transition from such a region to a portion to be clipped by guard value G1 or G2 is smoothed.

Alternatively, as shown in FIG. 12, if the peak value of raw value Y of the vibration-suppression torque is present between guard values G1, G2 and the frequency is at a level unlikely to be affected by the filtering processing, raw value Y of the requested vibration-suppression torque is output as it is as output vibration-suppression torque Q.

Figure 13:
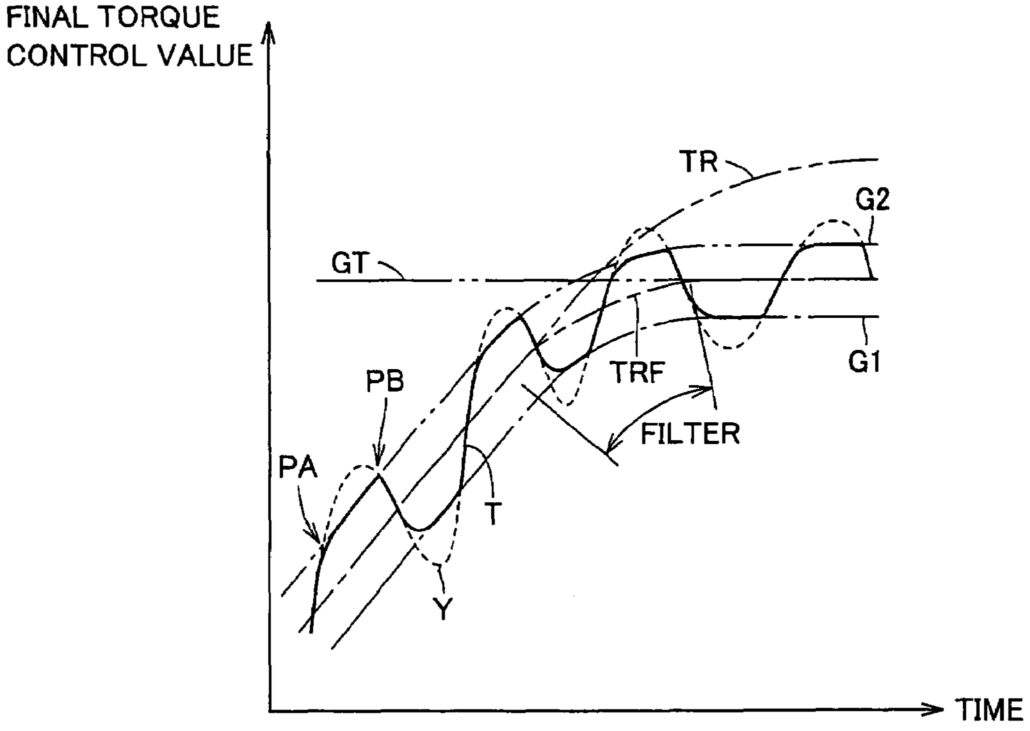
FIG. 13 is a waveform diagram showing a waveform of a final torque control value output in the second embodiment.
Figure 14:
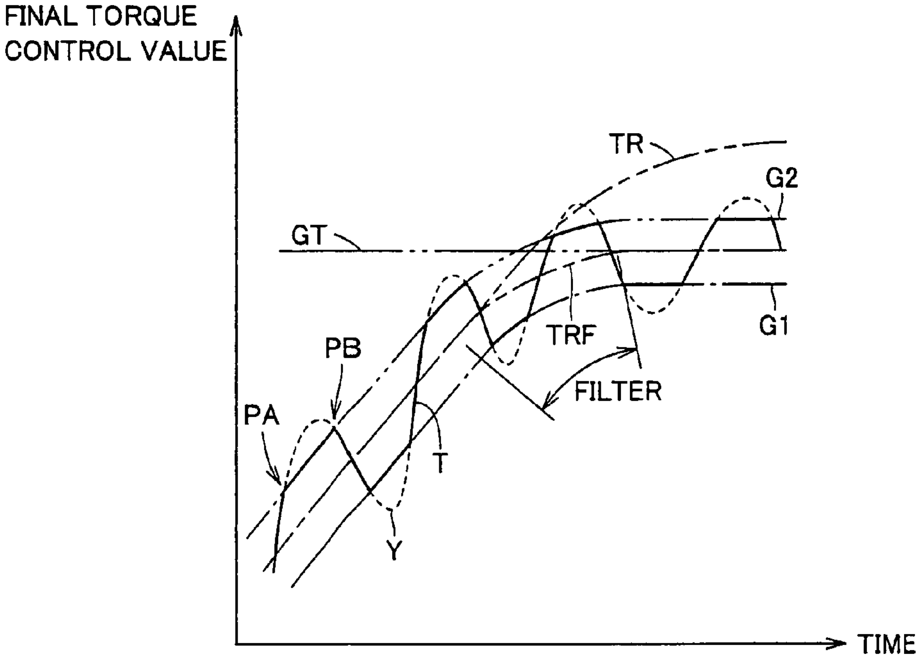
FIG. 14 is a diagram showing a waveform of the final torque control value obtained by applying a guard value.

FIG. 13 is a waveform diagram showing a waveform of the final torque control value output in the second embodiment.

As shown in FIG. 13, the portion of final torque control value T, outside guard values G1, G2 for raw value Y of the vibration-suppression torque, is subjected to clipping processing, while angular portions PA, PB are smoothed and phase delay of the vibration-suppression torque is also reduced. Therefore, the vibration-suppression effect is improved and smoother running can be realized.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A motor control device, comprising:

a main torque control value calculation unit calculating a main torque control value;

a final control torque value output unit outputting a final control torque value based on said main torque control value and a vibration-suppression torque control value for mitigating torque fluctuation that occurs when a rotating electric machine is operated at said main torque control value; and a vibration-suppression torque control value calculation unit calculating said vibration-suppression torque control value;

said vibration-suppression torque control value calculation unit including an original control value calculation unit calculating an original control value serving as a source of said vibration-suppression torque control value, a guard processing unit performing guard processing for restricting said original control value by using a vibration-suppression guard value, and a smoothing unit smoothing an angular portion where rate of change is discontinuous, that is generated in a torque control value that has been subjected to said guard processing.

2. The motor control device according to claim 1, wherein said main torque control value calculation unit includes an original main torque control value calculation unit calculating a first control value serving as a source of said main torque control value in accordance with an acceleration request, a main guard processing unit performing main guard processing for restricting said first control value by using a main guard value, and a main torque smoothing unit smoothing an angular portion where rate of change is discontinuous, that is generated in the first control value that has been subjected to said main guard processing, and outputting said main torque control value.

3. A motor control device, comprising:

a main torque control value calculation unit calculating a main torque control value;

a final control torque value output unit outputting a final control torque value based on said main torque control value and a vibration-suppression torque control value for mitigating torque fluctuation that occurs when a rotating electric machine is operated at said main torque control value; and a vibration-suppression torque control value calculation unit calculating said vibration-suppression torque control value;

said vibration-suppression torque control value calculation unit including an original control value calculation unit calculating an original control value serving as a source of said vibration-suppression torque control value, a provisional control value calculation unit calculating a provisional vibration-suppression torque control value by performing filtering processing, assuming that a vibration-suppression guard value is provided next time as said original control value to current said vibration-suppression torque control value, and a vibration-suppression torque control value selection unit selecting said vibration-suppression torque control value based on comparison of said provisional vibration-suppression torque control value with actually provided said original control value.

4. The motor control device according to claim 3, wherein said provisional control value calculation unit uses an upper limit value and a lower limit value as said vibration-suppression guard value to calculate first and second provisional vibration-suppression torque control values, and said vibration-suppression torque control value selection unit selects said original control value as said vibration-suppression torque control value while said actually provided original control value is present between said first and second provisional vibration-suppression torque control values, and selects any one of said first and second provisional vibration-suppression torque control values as said vibration-suppression torque control value, if said actually provided original control value is not present between said first and second provisional vibration-suppression torque control values.

5. The motor control device according to claim 3, wherein said main torque control value calculation unit includes an original main torque control value calculation unit calculating a first control value serving as a source of said main torque control value in accordance with an acceleration request, a main guard processing unit performing main guard processing for restricting said first control value by using a main guard value, and a main torque smoothing unit smoothing an angular portion where rate of change is discontinuous, that is generated in the first control value that has been subjected to said main guard processing, and outputting said main torque control value.

6. A motor control device, comprising: means for calculating a main torque control value;

means for outputting a final control torque value based on said main torque control value and a vibration-suppression torque control value for mitigating torque fluctuation that occurs when a rotating electric machine is operated at said main torque control value; and means for calculating said vibration-suppression torque control value;

said means for calculating said vibration-suppression torque control value including means for calculating an original control value serving as a source of said vibration-suppression torque control value, means for performing guard processing for restricting said original control value by using a vibration-suppression guard value, and means for smoothing an angular portion where rate of change is discontinuous, that is generated in a torque control value that has been subjected to said guard processing.

7. The motor control device according to claim 6, wherein said means for calculating the main torque control value includes means for calculating a first control value serving as a source of said main torque control value in accordance with an acceleration request, means for performing main guard processing for restricting said first control value by using a main guard value, and means for smoothing an angular portion where rate of change is discontinuous, that is generated in the first control value that has been subjected to said main guard processing, and outputting said main torque control value.

8. A motor control device, comprising:

means for calculating a main torque control value;

means for outputting a final control torque value based on said main torque control value and a vibration-suppression torque control value for mitigating torque fluctuation that occurs when a rotating electric machine is operated at said main torque control value; and means for calculating said vibration-suppression torque control value;

said means for calculating said vibration-suppression torque control value including means for calculating an original control value serving as a source of said vibration-suppression torque control value, means for calculating a provisional vibration-suppression torque control value by performing filtering processing, assuming that a vibration-suppression guard value is provided next time as said original control value to current said vibration-suppression torque control value, and means for selecting said vibration-suppression torque control value based on comparison of said provisional vibration-suppression torque control value with actually provided said original control value.

9. The motor control device according to claim 8, wherein said means for calculating a provisional vibration-suppression torque control value uses an upper limit value and a lower limit value as said vibration-suppression guard value to calculate first and second provisional vibration-suppression torque control values, and said means for selecting said vibration-suppression torque control value selects said original control value as said vibration-suppression torque control value while said actually provided original control value is present between said first and second provisional vibration-suppression torque control values, and selects any one of said first and second provisional vibration-suppression torque control values as said vibration-suppression torque control value, if said actually provided original control value is not present between said first and second provisional vibration-suppression torque control values.

10. The motor control device according to claim 8, wherein said means for calculating a main torque control value includes means for calculating a first control value serving as a source of said main torque control value in accordance with an acceleration request, means for performing main guard processing for restricting said first control value by using a main guard value, and means for smoothing an angular portion where rate of change is discontinuous, that is generated in the first control value that has been subjected to said main guard processing, and outputting said main torque control value.

11. A motor control device mounted on a vehicle, said vehicle including a rotating electric machine, a wheel that rotates along with rotation of said rotating electric machine, and said motor control device controlling said rotating electric machine, wherein said motor control device calculates a main torque control value, calculates an original control value serving as a source of a vibration-suppression torque control value for mitigating torque fluctuation that occurs when said rotating electric machine is operated at said main torque control value, performs guard processing for restricting said original control value by using a vibration-suppression guard value, smoothes an angular portion where rate of change is discontinuous, that is generated in a torque control value that has been subjected to said guard processing, and outputs a final control torque value based on said main torque control value and said vibration-suppression torque control value.

12. A motor control device mounted on a vehicle, said vehicle including a rotating electric machine, a wheel that rotates along with rotation of said rotating electric machine, and said motor control device controlling said rotating electric machine, wherein said motor control device calculates a main torque control value, calculates an original control value serving as a source of a vibration-suppression torque control value for mitigating torque fluctuation that occurs when said rotating electric machine is operated at said main torque control value, calculates a provisional vibration-suppression torque control value by performing filtering processing, assuming that a vibration-suppression guard value is provided next time as said original control value to current said vibration-suppression torque control value, selects said vibration-suppression torque control value based on comparison of said provisional vibration-suppression torque control value with actually provided said original control value, and outputs a final control torque value based on said main torque control value and said vibration-suppression torque control value.

* * * * *